Patented Nov. 1, 1932

1,885,949

UNITED STATES PATENT OFFICE

SIMON L. RUSKIN, OF NEW YORK, N. Y.

ORGANIC COMPOUNDS OF MANGANESE AND METHOD OF MAKING SAME

No Drawing.   Application filed February 24, 1930. Serial No. 431,068.

My invention relates to organic compounds of manganese for use in the treatment of diseases and it is my object to chemically combine manganese with a protein, nuclein or nucleoproteinate, thereby producing a new chemical. The invention further includes a method by which the chemical combination of the manganese with a protein, nuclein or nucleoproteinate may be effected.

The proteins are nitrogenous bodies which are amorphous solids having certain features in common but of no definite chemical formula, the fibrin of blood, gluten of flour, egg albumen and gelatine being examples of the protein series. The nucleins are derived from the proteins and are probably a mixture of organic compounds with the various proteins. In effect the nucleins are probably forms of protein. The similarity of the proteins and nucleins makes the combination of manganese with either or both within the scope of my invention, by which I produce a new article of manufacture which is a chemical combination of manganese, with a proteinate, nucleinate or proto-nucleinate.

For the purpose of disclosing my invention I will describe how manganese nucleinate may be produced by reacting a manganese salt (manganese sulphate) with a nucleinate. A proteinate or nucleoproteinate of manganese will be produced if a proteinate or nucleoproteinate is substituted for the nucleinate used in the process hereinafter set forth.

Distilled water is preferably used throughout my process.

To produce nucleinate of manganese 30 grams of sodium nucleinate (preferably made from yeast) is dissolved in 200 c. c. of water at a maximum temperature of 40° C.

27 grams of recrystallized manganous sulphate is dissolved in 50 c. c. of water. The hydrate of the manganous sulphate used preferably contains four molecules of water.

The two solutions are slowly mixed, with stirring, and a thick, curdy precipitate is formed which is principally nucleinate of manganese with uncombined manganous sulphate, sodium nucleinate, sulphate of soda and other impurities present.

This precipitate is filtered off and well washed with water to remove any excess of sodium nucleinate or manganous sulphate which may be uncombined, or any sodium sulphate which may have been formed as a by-product by interaction between the sulphate and the sodium.

The well washed precipitate thus obtained is put into 300 c. c. of water and a saturated solution of chemically pure sodium acetate is slowly added, with stirring, until the precipitate of manganese nucleinate is completely dissolved. The manganese nucleinate in solution is then precipitated with ethyl alcohol and filtered off, the filtrate being redissolved and reprecipitated until the manganese nucleinate is practically free from all impurities. The precipitated manganese nucleinate is next placed in ethyl alcohol and filtered and the filtrate put in ether and filtered, the final filtrate being dried, thus producing nucleinate of manganese free from impurities.

There is thus produced a soluble compound of nuclein and manganese in the form of a snow white, loose hygroscopic powder, easily soluble in water and in physiological salt solution.

Qualitative analysis has shown that the product contains a high percentage of manganese, approximately 35% and that it is in chemical combination with an organic substance.

It has been found by bacterial tests that the organic manganese compound thus produced inhibits the propagation of certain disease germs while at the same time solutions of it do not have a deleterious effect on animal tissues, rendering it of great value as an antiseptic and germicide.

By "protein-like substance" in the following claims I intend to include the proteinates, nucleinates and nucleoproteinates.

I claim:—

1. The process of making nucleinate of manganese consisting in dissolving sodium nucleinate in water, dissolving manganous sulphate in water, slowly mixing the two solutions with stirring, filtering off the precipitate, washing the precipitate in water, placing the washed precipitate in water and dissolving the same with a solution of sodium acetate, reprecipitating the nucleinate of manganese with ethyl alcohol and drying the precipitate.

2. The process of making nucleinate of manganese consisting in dissolving sodium nucleinate in water, dissolving manganous sulphate in water, slowly mixing the two solutions with stirring, filtering off the precipitate, washing the precipitate in water, placing the washed precipitate in water and dissolving the same with a solution of sodium acetate, reprecipitating the nucleinate of manganese with ethyl alcohol, washing the nucleinate of manganese in successive baths of ethyl alcohol and of ether, and finally drying the same.

3. As a new product, the soluble compound of nuclein and manganese in the form of a snow white, loose, hygroscopic powder easily soluble in water and in physiological salt solution and containing approximately thirty five percent of manganese.

In testimony whereof I have hereunto subscribed my name.

SIMON L. RUSKIN.